United States Patent [19]

Fortnagel

[11] E Patent Number: Re. 32,703

[45] Reissued Date of Patent: Jun. 28, 1988

[54] THROTTLING-PINTLE NOZZLE FOR FUEL INJECTION IN AN INTERNAL-COMBUSTION ENGINE

[75] Inventor: Manfred Fortnagel, Korb, Fed. Rep. of Germany

[73] Assignee: Daimler-Benz Aktiengesellschaft, Stuttgart, Fed. Rep. of Germany

[21] Appl. No.: 940,356

[22] Filed: Dec. 11, 1986

Related U.S. Patent Documents

Reissue of:

[64] Patent No.: 4,591,101
Issued: May 27, 1986
Appl. No.: 631,077
Filed: Jul. 16, 1984

[30] Foreign Application Priority Data

Jul. 22, 1983 [DE] Fed. Rep. of Germany ..... 3326468

[51] Int. Cl.[4] ..... F02M 61/06; B05B 1/32

[52] U.S. Cl. ..... 239/453; 239/533.12

[58] Field of Search ..... 239/453, 533.2–533.12

[56] References Cited

U.S. PATENT DOCUMENTS

| | | | |
|---|---|---|---|
| 2,067,131 | 1/1937 | Schdaupitz | 239/124 X |
| 2,951,647 | 9/1960 | Dreisin | 239/453 |
| 4,275,845 | 6/1981 | Müller | 239/533.12 |
| 4,440,348 | 4/1984 | di Aragora | 239/533.12 |

FOREIGN PATENT DOCUMENTS

| | | | |
|---|---|---|---|
| 2709917 | 9/1978 | Fed. Rep. of Germany . | |
| 2809414 | 9/1979 | Fed. Rep. of Germany | 239/533.3 |
| 2814999 | 10/1979 | Fed. Rep. of Germany . | |
| 2822675 | 11/1979 | Fed. Rep. of Germany | 239/533.4 |
| 2841967 | 4/1980 | Fed. Rep. of Germany | 239/533.3 |
| 2905921 | 8/1980 | Fed. Rep. of Germany . | |
| 3135133 | 4/1982 | Fed. Rep. of Germany . | |
| 3113755 | 12/1982 | Fed. Rep. of Germany . | |
| 3326468 | 7/1986 | Fed. Rep. of Germany . | |
| 105620 | 8/1977 | Japan . | |
| 2133833 | 8/1984 | United Kingdom | 239/533.12 |

OTHER PUBLICATIONS

Robert Bosch GmbH, Olhydravlik, 5th Edition, Mar. 1963, pp. 256–257.

*Primary Examiner*—Andres Kashnikow
*Assistant Examiner*—Mary Beth O. Jones
*Attorney, Agent, or Firm*—Barnes & Thornburg

[57] ABSTRACT

The invention relates to a throttling-pintle nozzle for fuel injection in an internal-combustion engine, with a nozzle needle which lifts off from its needle seat under the pressure of the injected fuel counter to the direction of flow of the fuel. The throttling pintle of which is located within the spray hole in the closing position of the nozzle needle. To prevent an unduly sharp variation in the injection rate from occurring as a result of coking residues in the spray hole, the pintle is provided with a special flattened portion which is arranged obliquely relative to the center axis of the pintle, so that with an increasing stroke of the needle in the opening direction an increase in the passage cross-section represented by an oblique flattened portion takes place.

5 Claims, 1 Drawing Sheet

THROTTLING-PINTLE NOZZLE FOR FUEL INJECTION IN AN INTERNAL-COMBUSTION ENGINE

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to a throttling-pintle nozzle for fuel injection in an internal-combustion engine having a prechamber engine.

In conventioanl throttling-pintle nozzles the fuel flows out in the pre-injection phase only through the annular gap formed by the pintle and spray hole. The coke layer forming on the surface of the spray hole and pintle during the running of the engine has an adverse effect on the injection characteristic. The accumulation of coke results in a change in shape and sharp reduction of the annular gap. Eventually, an irregular surface of the spray-hole wall results which has an adverse effect on the injection rate of the fuel, the jet form and atomisation of the fuel and consequently on combustion.

To make it possible to overcome these disadvantages effectively, it has already been proposed to prevent the coking up of the passage cross-section, by providing a throttling-pintle nozzle with a flattened portion extending parallel to the longitudinal axis of the throttling pintle (German Unexamined Published Application (DE-OS) No. 28 09 414).

However, even this special passage cross-section fails to ensure injection rates which are fully satisfactory, since even here, because of unavoidable coking, the desired injection rate and the jet form and atomisation cannot be maintained.

An object of the present invention is to provide an improved throttling-pintle nozzle, by means of simple measures, in such a way that it makes it possible to obtain a proportioning cross-section which is less sensitive to coking and which, in the stabilized state, guarantees a good injection rate during prolonged use.

According to preferred embodiments of the invention, a throttling-pintle nozzle arrangement is provided for fuel injection in an internal-combustion engine, especially a prechamber engine of the type including a nozzle needle which lifts off from its needle seat, counter to the direction of flow of the fuel under the pressure of the injected fuel, and the throttling pintle of which is located within a spray hole in the closing position of the nozzle needle. Between the spray hole and pintle, relative to the periphery of the spray hole, there is a passage cross-section for the fuel in the overlap region, which passage is formed by a flattened portion on the pintle extending over the entire length of the pintle. The improvement of the invention comprises configuring the flattened portion of the throttling pintle to extend obliquely relative to the center axis of the pintle, in such a way that the largest passage cross-section is at the mouth of the spray hole, located on the same side as the combustion space.

By utilizing a throttling-pintle nozzle made in accordance with the invention, it is possible to obtain a desired optimum injection rate. This is achieved by appropriately inclining the flattened surface on the throttling pintle. The coking behaviour of the nozzle is markedly improved, since the special passage cross-section increases with an increasing stroke of the needle in the opening direction. A particular advantage is that in the region where the nozzle needle and bore overlap (pre-injection), in view of the coking which is unavoidable in the combustion space, as a result of the inclination of the surface on the one hand an injection rate which starts gently can be obtained. Additionally, the injection quantity can be increased in the region of the overlap, so that the transition from pre-injection to main injection takes place without a sharp break as is preferred in such systems. Substantially more favourable cylinder-pressure characteristics can be achieved, together with improved noise emission characteristics.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
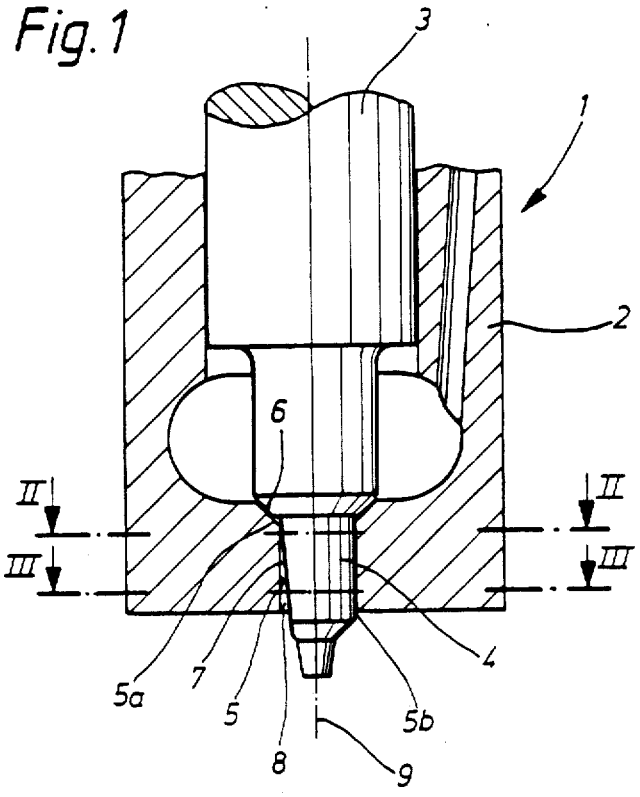
FIG. 1 is a partial schematic part-sectional view which shows the lower part of a throttling-pintle nozzle constructed in accordance with the present invention.

The throttling-pintle nozzle 1 according to FIG. 1. intended for an air compression internal-combustion injection engine, contains in the nozzle body 2 a nozzle needle 3 which, in the closing position, projects into a spray hole 5 by means of its throttling pintle 4 and lifts off from its needle seat 6 counter to the direction of flow.

Figure 2:
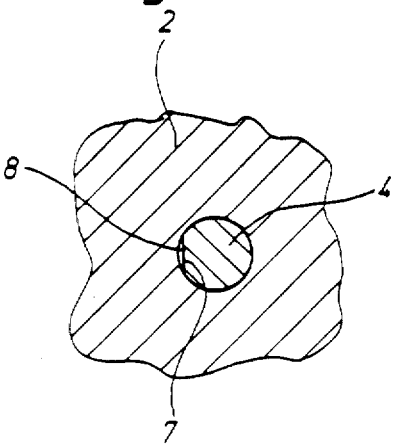
FIG. 2 is a sectional view taken along the line II—II in FIG. 1.
Figure 3:
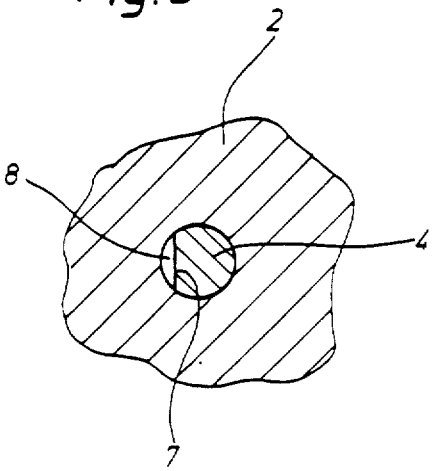
FIG. 3 is a sectional view along the line III—III in FIG. 1.

As can be seen from FIG. 1, the pintle 4 has a flattened portion 7 which extends over its entire length and which is designed so that the passage cross-section 8 increases, starting from the inlet 5a up to the mouth 5b of the spray hole 5, located on the same side as the combustion space (FIGS. 2 and 3). The flattened portion 7 is arranged inclined approximately 6° (*at an angle of about 3° to about 9°*) relative to the centre axis 9 of the nozzle needle 3, so that a passage cross-section for the fuel to be injected, which is more favourable for the injection rate, is obtained between the spray hole 5 and the pintle 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A throttling pintle nozzle arrangement for fuel injection in an internal-combustion engine comprising:

nozzle body means defining a spray hole, said spray hole exhibiting a mouth, and said nozzle body means defining a nozzle needle seat portion, nozzle needle means including a throttling pintle disposed for movement within the nozzle body means to control the flow of fuel through the spray hole via a passage between the pintle and the nozzle body means, said throttling pintle having a flattened portion, said nozzle needle means being operable to be lifted off said nozzle needle seat portion under pressure of injected fuel in a direction counter to the direction of flow of the fuel, and the fuel flowing through the passage, said passage being defined by the nozzle body means and the flattened portion of the pintle, said flattened portion extending over the entire length of the pintle and being arranged at an angle relative to a center axis of the pintle, such that the largest cross-section of the passage is at the mouth of the spray hole.

2. The arrangement according to claim 1, wherein the flattened portion of the pintle is at an angle of about 3° to about 9° with respect to the center axis of the pintle.

3. The arrangement according to claim 2, wherein the flattened portion of the pintle is at an angle of 6° with respect to the center axis of the pintle.

*4. A throttling pintle nozzle arrangement for fuel injection in an internal-combustion engine comprising:*

*nozzle body means defining a spray hole, said spray hole exhibiting a mouth, and said nozzle body means defining a nozzle needle seat portion,*

*nozzle needle means including a throttling pintle having a flattened portion disposed for movement within the nozzle body means to throttle the flow of fuel through the spray hole via a passage between at least a portion of said flattened portion of the pintle and the nozzle body means,*

*said nozzle needle means being operable to be lifted off said nozzle needle seat portion under pressure of injected fuel in a direction counter to the direction of flow of the fuel, and the fuel flowing through the passage, said flattened portion extending over a substantial length of the pintle and being arranged at an angle relative to a center axis of the pintle, such that the largest cross-section* of the passage is at the mouth of the spray hole.

*5. A throttling pintle nozzle arrangement for fuel injection in an internal-combustion engine comprising:*

*nozzle body means, a portion of the nozzle body means defining a spray hole, said spray hole exhibiting an inlet and a mouth, and another portion of said nozzle body means defining a nozzle needle seat portion,*

*nozzle needle means including a throttling pintle disposed for axial movement within the nozzle body means to control the flow of fuel through the spray hole via a passage delimited on one side by the portion of the nozzle body means defining the spray hole and delimited on an opposite side by a portion of the pintle that is axially moveable within the spray hole, said portion of the pintle that is axially moveable within the spray hole defining an effective throttle length of the pintle, said pintle having a flattened portion along its effective throttle length,*

*said nozzle needle means being operable to be lifted off said nozzle needle seat portion under pressure of injected fuel in a direction counter to the direction of flow of the fuel, and the fuel flowing through the passage, said flattened portion being arranged at an angle relative to a center axis of the pintle, such that the largest cross-section of the passage is at the mouth of the spray hole.*

* * * * *